United States Patent [19]

Terlaak

[11] 4,424,873

[45] Jan. 10, 1984

[54] CONSTANT BELT TENSION ASSEMBLY FOR WHEELCHAIRS

[75] Inventor: Daniel J. Terlaak, Columbia Hills, Ohio

[73] Assignee: Invacare Corporation, Elyria, Ohio

[21] Appl. No.: 326,493

[22] Filed: Dec. 2, 1981

[51] Int. Cl.³ .......................... F16H 7/10; B60K 17/04

[52] U.S. Cl. ............................ 180/65 E; 180/DIG. 3; 192/11; 474/137

[58] Field of Search ........................ 180/65 E, DIG. 3; 280/242 WC; 297/DIG. 4; 474/134, 135, 136, 137, 138; 192/11

[56] References Cited

U.S. PATENT DOCUMENTS

| | | | |
|---|---|---|---|
| 1,582,516 | 4/1926 | Gibson | 474/137 |
| 3,064,744 | 11/1962 | Jennings | 180/DIG. 3 |
| 3,575,058 | 4/1971 | Kraus | 474/135 X |
| 3,598,194 | 8/1971 | Wappler et al. | 474/135 X |
| 3,834,477 | 9/1974 | Sandow | 474/135 X |
| 4,012,963 | 3/1977 | Ehters et al. | 474/135 |

FOREIGN PATENT DOCUMENTS

| | | | |
|---|---|---|---|
| 1004584 | 3/1952 | France | 192/11 |

*Primary Examiner*—Joseph F. Peters, Jr.
*Assistant Examiner*—Michael Mar
*Attorney, Agent, or Firm*—Fay & Sharpe

[57] ABSTRACT

A wheelchair having left and right drive wheels (18, 26) each connected with a wheel pulley (16). Left and right electric drive motors (10) are connected with drive pulleys (12, 20). V-belts (14) extending between the drive and wheel pulleys. Left and right belt-pulley engagement improvement assemblies (40, 60) urge the belts further around the circumference of the drive pulleys to improve frictional engagement and reduce slippage. Each engagement improving assembly includes a first roller (84) and a second roller (94) disposed adjacent an associated drive pulley (20) for selectively urging a first portion (52) and a second portion (54) of the belt together. As the belt portions move toward each other, the belt wraps further around the drive pulley increasing the frictional engagement area reducing the amount of tension required for non-slipping engagement between the belt and the pulley. The first roller (84) is disposed on a first slide assembly (62) and the second roller is disposed on a second slide assembly (64). The first slide assembly slides freely on a guide rod (60) and the second slide assembly is limited in its movement by a tension limiting spring (72). A pivot (102) and cam (104, 108) assembly selectively move the guide rod and first slide assembly relative to each other to move the first and second rollers into and out of engagement with the belt.

13 Claims, 4 Drawing Figures

CONSTANT BELT TENSION ASSEMBLY FOR WHEELCHAIRS

BACKGROUND OF THE INVENTION

This application pertains to the art of power drive assemblies and more particularly belt drive assemblies. The invention finds particular application in power drives for wheelchairs in which a pair of power drive assemblies are coordinated or synchronized. Although the preferred embodiment is described in conjunction with power wheelchairs, it is to be appreciated that the invention has broader applications including belt drives between motors and fans, pumps, pulleys, winches, and other rotatably driven apparatus.

Helicopters have utilized a pair of rollers which wrap a drive belt more completely around a driving and/or driven pulley to increase the area of frictional engagement between the belt and pulley. This increased area of engagement reduced belt pulley slippage. Electric wheelchairs have commonly included a pair of electric motors one of which was connected by a left belt drive with the left rear driving wheel and the other of which was connected with a right belt drive to the right rear driving wheel. Each motor was connected by a gearbox with a pulley disposed in the same plane as a pulley on its associated rear wheel. A V-belt extended around the drive pulley and the rear wheel pulley. Each motor, its associated gearbox and pulley were mounted within the wheelchair in a manner which allowed them to be moved fore and aft relative to the rear wheel such that the tension on the V-belt could be adjusted. Typically, 55 pounds of tension were required on the belt to transmit 150 inch pounds of torque without slippage.

One of the problems with the prior art high tension wheelchair drive assemblies was that the belts tended to wear or stretch which induced slippage relative to the pulleys. Uneven slippage between the left and right drive assemblies would cause the wheelchair to undergo unexpected and undesired turning motions.

Another of the problems with maintaining the high tension on the belts was that the pulleys were overloaded. The overloading shortened belt life and increased the wear on the bearings associated with the gearbox and pulleys. Still another problem resulting from the high belt tension of the prior art wheelchairs was that the batteries drained relatively rapidly. A pair of series connected 12-volt, 45 ampere-hour related batteries, as commonly used in wheelchairs, provide a driving range of about 15–16 miles per charge. The battery drain was attributable not only to energy to move the chair but to the power required to overcome frictional and other loads attributable to the high belt tension.

BRIEF DESCRIPTION OF THE INVENTION

The present invention contemplates a new and improved belt drive assembly which overcomes the above referenced problems and others. It provides a drive assembly which reduces slippage between the belts and pulleys without increasing belt tension.

In accordance with the present invention, there is provided a drive or first pulley, a second pulley, a belt disposed in relatively loose frictional engagement with the pulleys, and an engagement improving assembly for urging the belt around the circumference of at least one of the pulleys, whereby the surface area over which one of the pulleys and the belt frictionally engage each other is increased and the tendency for slippage is reduced.

In accordance with another aspect of the invention, there is provided a wheelchair which includes a pair of electric motors each of which drive a corresponding drive pulley, and a pair of ground engaging wheels each of which is connected with a wheel pulley that rotates with its associated wheel. A pair of belts are disposed in loose frictional engagement between each of the drive pulleys and the corresponding wheel pulley. A pair of engagement improving assemblies are mounted on the wheelchair, one disposed adjacent each drive pulley for selectively urging the associated belt further around the circumference of the drive pulley, whereby the surface area over which the pulley and drive belt interact is increased to reduce any tendency for slippage between the belt and the drive pulley.

A primary advantage of the present invention is that it substantially reduces slippage between belts and pulleys in either direction of pulley rotation at low tension.

Another advantage of the present invention is that it increases belt and bearing life. The present invention applies a relatively low, controlled tension to the belt. In the preferred embodiment, a belt tension of 6 pounds provides non-slip transmission of 150 inch pounds of torque, i.e. about a 90% reduction in belt tension over the prior art.

Yet another advantage of the present invention is that it extends the driving range. In the preferred embodiment, over a 40% increase in driving range per battery charge is achieved, i.e. about 25 miles per charge as opposed to the prior art 15–16 miles per charge.

Still further advantages of the present invention will become apparent to others upon reading and understanding the following detailed description of the preferred embodiment.

BRIEF DESCRIPTION OF THE DRAWINGS

The present invention may take form in various parts and arrangements of parts. The drawings are only for purposes of providing a detailed illustration of a preferred embodiment of a drive assembly which incorporates the present invention and are not to be construed as limiting the invention.

DETAILED DESCRIPTION OF THE PREFERRED EMBODIMENT

Figure 1:
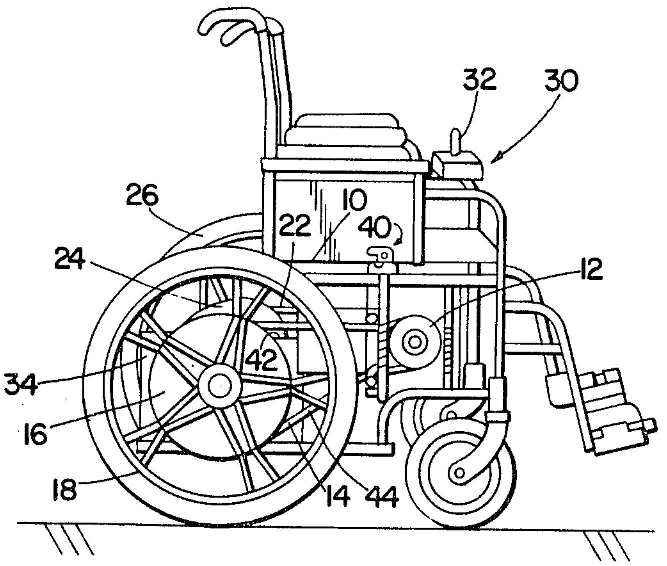
FIG. 1 is a perspective view of an electric wheelchair having a drive assembly in accordance with the present invention.
Figure 4:
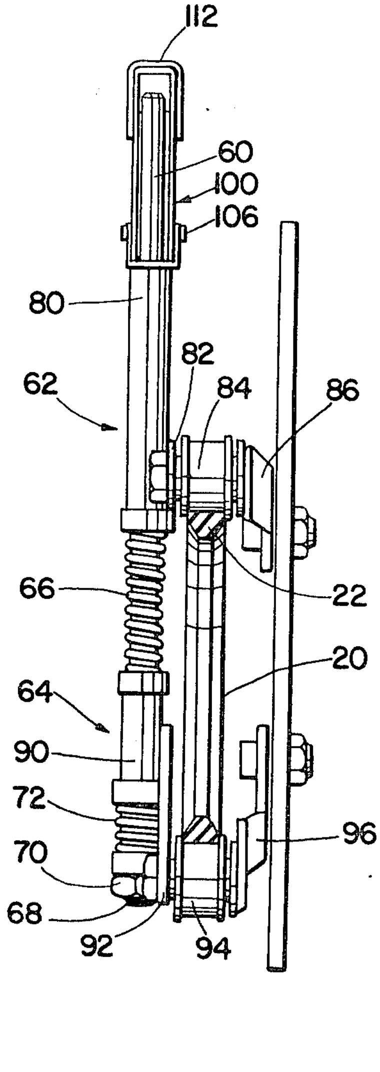
Figure 3:
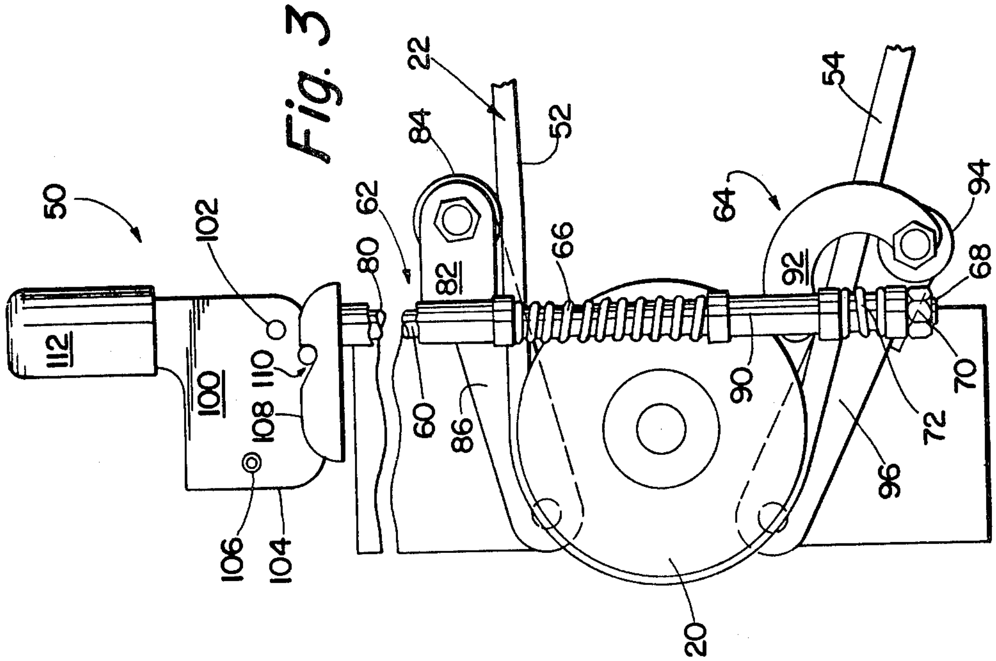
FIG. 3 illustrates the belt engagement improving assembly of FIG. 2 in a disengaged configuration; and, FIG. 4 is a side view of the belt engagement improving assembly of FIG. 2.
Figure 2:
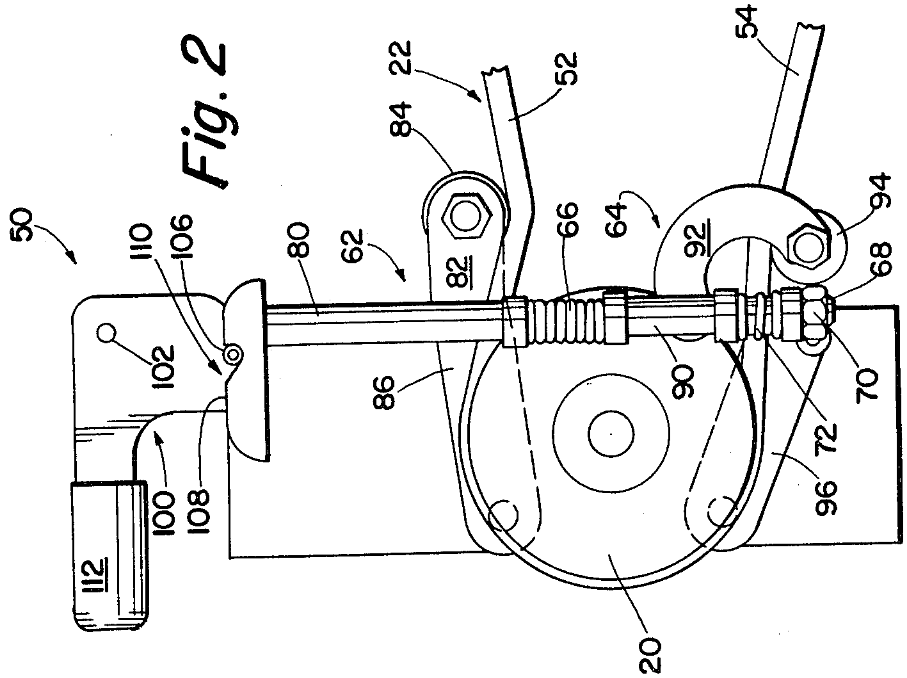
FIG. 2 illustrates a belt engagement improving assembly in accordance with the present invention in an engaged position.

With reference to FIG. 1, there is illustrated an electric wheelchair which includes a right side electric motor 10 which is connected by a gearbox (not shown) with a right side drive pulley 12. A right side V-belt 14 interconnects the right drive pulley 12 with a right driven, wheel pulley 16 which is connected with a right rear drive wheel 18. Commonly on wheelchairs, the drive pulley 12 is smaller in diameter than the wheel pulley 18 to gain a mechanical advantage. This results in the belt wrapping around the larger circumference wheel pulley more than 180° and around the smaller diameter drive pulley less than 180°. With reference to FIGS. 2, 3, and 4, a left electric motor is connected by a gearbox with a left side drive pulley 20 of like construction on the opposite side of the chair. With continuing reference to FIG. 1, the left drive pulley 20 is connected by a left V-belt 22 with a driven, wheel pulley 24 which is mounted for rotation with a left rear wheel 26. A control means 30 is provided for enabling the operator to control the left and right motors and, hence, the speed and turning of the wheelchair. The control means includes a joy stick 32 which moves forward and back to control the amount of power delivered to the motors and left to right to control the relative amount of power supplied to the left and right motors. In this manner, the joy stick enables the operator to select a forward or reverse speed and to cause the wheelchair to turn left or right with varying radii of curvature. A battery pack 34 provides electric power for operating the control means and the electric motors.

A right belt engagement improving or slippage reducing assembly 40 is disposed adjacent the right drive pulley 12 for urging the right V-belt 14 to wrap further around the circumference of the pulley 12. More specifically, the right engagement improving means 40 selectively urges a first portion or run 42 of the V-belt running between the wheel and drive pulleys and a second portion or run 44 of the belt running between the two pulleys toward each other. By urging the two portions of the V-belt toward each other. By urging the two portions of the V-belt toward each other, the V-belt is caused to wrap more completely around the circumference of the pulleys, particularly the smaller diameter right drive pulley 12. As the V-belt wraps further around the pulley, the area of engagement between the belt and the pulley increases which increases their frictional engagement and reduces slippage therebetween. Preferably, the engagement improving means causes the belt to wrap more than 180° around both the drive and wheel pulleys. In the preferred embodiment, the drive pulley has a four inch diameter and the wheel pulley a twelve inch diameter. With this geometry, the belt engagement improving means increase the wrap of the belt from about 170° to about 190° around the drive pulley.

With primary reference to FIGS. 2 and 3, a left engagement improving or slippage reducing assembly 50 is disposed adjacent the left drive pulley 20 for urging first and second portions 52 and 54 of the left V-belt 22 to wrap further around the pulley. For simplicity of illustration, rather than explaining both the like left and right engagement improving assemblies, the left engagement improving assembly 50 is illustrated and explained in detail in conjunction with FIGS. 2, 3 and 4 and it is to be appreciated that this explanation applies equally to the right engagement improving assembly 40. The left engagement improving assembly 50 includes a guide rod 60 on which a first slide assembly 62 and a second slide assembly 64 are slidably mounted. Disposed on the guide rod between the first and second slide assemblies is a coil spring 66 for biasing the first and second slide assemblies apart. One end 68 of the guide rod 60 is threaded to receive a threaded element or nut 70. A tension limiting coil spring 72 is disposed around the guide rod 60 between the threaded element 70 and the second slide assembly 64. By rotating the threaded element 70 relative to the threaded end 68 of the guide rod 60, the tension of the tension limiting spring 72 is adjustable.

The first slide assembly 62 includes a sleeve portion 80 to which an outward extending arm 82 is rigidly connected. Rotatably mounted on the first arm 82 is a first roller 84. A first link 86 is pivotally connected at one end with the first slide assembly along the central axis of the first roller 84 and pivotally connected at its other end with the wheelchair frame adjacent the left side drive pulley.

The second slide assembly 64 includes a sleeve portion 90 which is slidably mounted on the guide rod 60 to which an outward extending arm 92 is rigidly connected. The second slide assembly 64 is connected with the guide rod 60 by the tension limiting spring 72. The second slide assembly moves with the guide rod until the force required to move the belt portions together exceeds the force required to compress the tension limiting spring. In this manner, the force applied by the second roller is limited by the spring constant of spring 72. Rotatably mounted on the second arm 92 is a second roller 94 which selectively engages the exterior surface of the second V-belt portion 54. A second link 96 is pivoted at one end with the second slide assembly along the central axis of the second roller 94 and pivotally connected at its other end with the wheelchair frame.

The first and second pivotal links are disposed symmetrically about an axis through the drive pulley axis and midway between the first and second belt portions 52 and 54. The pivotal connections between links 86 and 96 and the wheelchair frame support the engagement improving assembly 50. This allows the engagement improving assembly to float and change position when the drive motor changes direction and first and second belt portions 52 and 54 switch between their driving and return functions. Thus, taken together, the first link 86 and second link 96 are a floatable connection means for allowing the engagement improving assembly to float relative to the drive pulley.

A moving means 100 moves the guide rod 60 relative to the first slide assemblies 62 between belt engaging and disengaging portions. The moving means 100 includes a pivot pin 102 for pivotally connecting it with one of the guide rod and the first slide assembly and a camming surface 104 for selectively camming against the other. In the preferred embodiment, the moving means is pivotally connected with the guide rod 60 and cammed against an upper edge of the first slide assembly 62. The moving means includes a locking pin 106 which cams against a first slide assembly surface 108 duplicating the camming action of camming surface 104. The first slide assembly has a locking recess 110 therein for receiving the locking pin 106 in a secure arrangement to hold the tensioning assembly in the engaging position. A manually graspable handle 112 is provided for pivoting the moving means between the engaging position illustrated in FIG. 2 and the disengaging position illustrated in FIG. 3.

With particular reference to FIG. 2, as the moving means 100 is moved into the engaging position, the pivot pin 102 exerts an upward, in the orientation of FIG. 2, force on the guide rod 60 as the camming surface 104 and locking pin 106 exerts a downward force on the first slide assembly 62. The upward force is transmitted through the guide rod 60 and the tension limiting spring 72 to the second slide assembly 64. This causes the first slide assembly and second slide assemblies to move toward each other. As the first and second slide assemblies move toward each other, the first and second rollers 84 and 94 move toward each other engaging the first and second portions 52 and 54 of the belt. As the rollers 84 and 94 move towards each other the belt is wrapped further around the left-hand power drive pulley 20. Because the force from the guide rod to the second slide assembly is conveyed through the tension limiting spring 72, the amount of tension which the rollers can apply to the belt is limited by the tension spring.

As the rollers move toward each other, the lever arms 86 and 96 perform two functions. First, they provide support for one end of the axles of rollers 84 and 94 to assure that the rollers remain accurately aligned with the belt portions regardless of the direction which the drive pulley is rotated. Secondly, the divergence of the belt away from the drive pulley 20 tends to cam the guide rod and the first and second slide assemblies structures toward the drive pulley as the rollers are brought toward each other. This camming could result in bending or arcing of the guide rod rather than deflecting the V-belt portions toward each other. The links 86 and 96, thus allow verticle float with changes in the direction of rotation and limit the fore and aft movement which the rollers, hence the guide rod, are able to undergo.

When the handle is moved to the disengaging position illustrating FIG. 3, the V-belt tends to bias the rollers 84 and 94 apart. The biasing spring 66 also biases the slide assemblies and rollers apart such that the rollers can be moved out of contact with the first and second portions of the belt. When the tensioning assembly is in its disengaged position, the tension is readily adjustable by rotating the threaded element or nut 70 relative to the threaded guide rod end portion 68. In the preferred mode of operation, the threaded element 70 and threaded rod end 68 are adjusted such that in the engaging position, the tension limiting spring 72 is partially compressed. As the belt wears and stretches, the tension limiting spring expands maintaining the same belt tension. When the belt stretches sufficiently that the tension belt spring is fully extended, the engagement improving assembly is disengaged and the threaded element is adjusted on the threaded guide rod end.

Alternately, other mechanisms for moving the first and second rollers towards each other may be utilized. For example, the first and second slides could be connected with the guide rod with forward and reverse threads and the moving means could rotate the guide rod. Other known linkages for selectively moving the rollers toward and away from each include scissors arrangements, clamping arrangements, and the like.

The invention has been described with reference to the preferred embodiment. Obviously, modifications and alterations will occur to others upon reading and understanding the detailed description of the preferred embodiment. It is intended that the invention be construed as including all such modifications and alterations insofar as they come within the scope of the appended claims or the equivalents thereof.

Having thus described a preferred embodiment which incorporates our invention, we now claim our invention to be:

1. An electric wheelchair comprising:

a wheelchair frame;

a drive pulley which is adapted to be rotated by a motor, the drive pulley and motor being operatively connected with the wheelchair frame;

a wheel pulley for rotating a ground engaging wheel;

a belt disposed in relatively loose frictional engagement partially around the circumference of the drive and wheel pulleys;

a guide rod;

a first slide assembly slidably mounted on the guide rod;

a first roller movably mounted near one of the pulleys and a first portion of the belt, the first roller being operatively connected with the first slide assembly;

a second roller operatively connected with the guide rod adjacent said one of the pulleys and adjacent a second portion of the belt;

means for selectively moving the first and second rollers toward the belt first and second portions such that the rollers urge the belt to wrap further around the circumference of the one of the pulleys;

a first link operatively connected with the first roller and pivotally connected at one end with the wheelchair frame adjacent the first drive pulley; and, a second link operatively connected with the second roller and pivotally connected at one end with the wheelchair frame adjacent the first drive pulley.

2. A wheelchair drive assembly comprising:

a drive pulley which is adapted to be rotated by a motor;

a wheel pulley for rotating a ground engaging wheel;

a belt disposed in relatively loose frictional engagement partially around the circumference of the drive and wheel pulleys;

a guide rod;

a first slide assembly slidably mounted on the guide rod;

a second slide assembly slidably mounted on the guide rod;

a first roller operatively connected with the first slide assembly adjacent said one of the pulleys and adjacent a first portion of the belt;

a second roller operatively connected with the second slide assembly adjacent said one of the pulleys and adjacent a second portion of the belt;

means for selectively moving the first and second rollers toward each other;

a tension limiting coil spring disposed around the guide rod, one end of the tension limiting spring being in operative contact with the guide rod and the other end being operatively connected with the second slide assembly.

3. The wheelchair drive assembly as set forth in claim 2 wherein the engagement improving assembly further includes a biasing spring mounted between the first and second slide assemblies for biasing the slide assemblies and the first and second rollers apart.

4. The wheelchair drive assembly as set forth in claim 3 wherein the guide rod has a threaded portion with a threaded element rotatably mounted thereon, the threaded element being operatively connected with the tension limiting spring one end such that rotation of the threaded element relative to the guide rod threaded portion adjusts the compression of the tension limiting spring.

5. The wheelchair drive assembly as set forth in claim 2 wherein the moving means includes a structure which is pivotably connected with one of the guide rod and the first slide assembly and which has a camming surface for selectively camming against the other of the guide rod and the first sliding assembly to cause relative movement therebetween between a belt engaging position and a disengaging position.

6. The wheelchair drive assembly as set forth in claim 5 further including a manually operable handle which is operatively connected with the moving means for facilitating manual movement between the belt engaging and disengaging positions.

7. An electric wheelchair comprising:

a wheelchair frame;

at least a first ground engaging wheel rotatably mounted on the frame;

a first wheel pulley operatively connected with the first ground engaging wheel for rotating with the ground engaging wheel;

at least a first electric motor mounted on the frame for rotating a first drive pulley, the first electric motor being operatively connected with the first drive pulley;

a control means operatively connected to the first electric motor for controlling electric power flowing from a battery means to the first electric motor;

a first flexible belt disposed in frictional engagement partially around the circumference of the first drive pulley and partially around the circumference of the first wheel pulley, the first flexible belt having a first portion and a second portion, both extending generally tangentially to the first wheel pulley and generally tangentially to the first drive pulley; and, a first engagement improving assembly disposed adjacent the first drive pulley for urging the first and second belt portions toward each other such that the first belt is urged to wrap further around the first drive pulley circumference, the first engagement improving assembly including:

a first roller for engaging the first belt portion;

a second roller for engaging the second belt portion;

a first link operatively connected with the first roller and pivotally connected at one end with the wheelchair frame adjacent the first drive pulley;

a second link operatively connected with the second roller and pivotally connected at one end with the frame adjacent the first drive pulley, whereby the links allow the engagement improving assembly to float relative to the first drive pulley; and moving means for selectively moving the first and second rollers toward each other such that the first and second belt portions move toward each other wrapping the first belt further around the circumference of the first drive pulley.

8. The wheelchair drive assembly as set forth in claim 7 wherein the first and second links are disposed symmetrically about the first driven pulley.

9. The wheelchair drive assembly as set forth in claim 7 further including a tension limiting spring operatively connected with the rollers for limiting the pressure with which the rollers urge the belt portions toward each other, whereby the belt tension is limited.

10. The electric wheelchair as set forth in claim 8 wherein the engagement improving assembly further includes a guide rod an a first slide assembly slidably disposed on the guide rod, the second roller being operatively supported by the guide rod and the first roller being operatively supported by the first slide assembly and wherein the moving means causes relative movement between the guide rod and the first slide assembly.

11. The electric wheelchair as set forth in claim 10 wherein the engagement improving assembly further includes a second slide assembly slidably mounted on the guide rod a tension limiting spring in operative contact with the second slide assembly and the guide rod, the second roller being operatively connected with the second slide assembly.

12. A drive assembly comprising:

a drive pulley;

a belt disposed in loose frictional engagement partially around the circumference of the drive pulley; and, an engagement improving assembly for selectively urging the belt further around the circumference of the drive pulley, the engagement improving assembly including:

a guide rod;

a first slide assembly slidably mounted on the guide rod;

a first roller movably mounted on the first slide assembly adjacent the drive pulley and adjacent a first portion of the belt;

a second slide assembly slidably mounted on the guide rod;

a second roller mounted on the second slide assembly adjacent the pulley and adjacent a second portion of the belt which is disposed around the drive pulley from the first portion of the belt;

a floatable connection means for allowing the engagement improving assembly to float relative to the drive pulley;

means for selectively moving the first and second slide assemblies toward each other and for moving the first and second portions of the belt toward each other;

a tension limiting spring operatively connected between the moving means and at least one of the slide assemblies such that the tension limiting spring limits the force with which the moving means moves the first and second rollers against the belt and toward each other; and, a biasing spring mounted between the first and second slide assemblies for biasing the first and second slide assemblies apart;

whereby the movement of the rollers toward each other wraps the belt further around the circumference of the pulley to reduce slippage therebetween.

13. The drive assembly as set forth in claim 12 wherein the floatable connection means includes a first link connected with the first roller at one end and pivotally connected at its other end with a stationary structure adjacent the drive pulley, and a second link pivotally connected at one end with the second roller and pivotally connected adjacent its other end with the stationary structure adjacent the drive pulley, such that the first and second links allow the engagement improving assembly to float relative to the drive pulley.

* * * * *